May 26, 1964 E. RAINER 3,134,914
ELECTRONIC DEVICE FOR DIGITAL INTEGRATION
Filed March 30, 1962
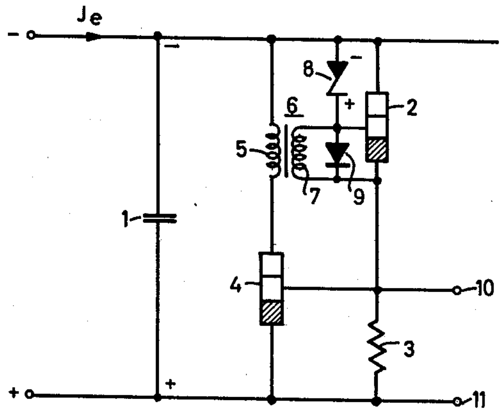

United States Patent Office 3,134,914
Patented May 26, 1964

3,134,914
ELECTRONIC DEVICE FOR DIGITAL INTEGRATION

Erich Rainer, Nurnberg, Germany, assignor to Siemens-Schuckertwerke Aktiengesellschaft, Berlin-Siemensstadt, Germany, a corporation of Germany
Filed Mar. 30, 1962, Ser. No. 183,804
Claims priority, application Germany Apr. 6, 1961
3 Claims. (Cl. 307—88.5)

My invention relates to an electronic device for digitally integrating a time function, or, more generally, for analog-to-digital conversion.

It is conventional to integrate any continuous function of time, or other continuously variable or analog magnitudes by converting them into an electric current or voltage and using the current or voltage for charging a capacitor. Upon attaining a given limit voltage, the capacitor is discharged by closing a switch, preferably of the electronic type. When this charging and discharging operation is repeated at sufficient rapidity, the number of discharges directly represents a measure of the integral for the given function and can be indicated or otherwise processed by means of a counting mechanism.

The accuracy of such digital integration depends mainly upon accurate maintenance of the critical limit voltage at which the capacitor discharge commences, and also upon achieving the highest possible ratio between the charging and discharging periods. During discharge the capacitor is short-circuited so that no integration can take place during this interval, this manifesting itself as an error or error range in the ultimate result of the integration or conversion.

It is an object of my invention to increase the accuracy of digital integrators and analog-to-digital converters of the above-mentioned type.

To this end and in accordance with my invention, I connect parallel to the capacitor to be charged, a first transistor in series with a resistor, the latter serving to provide voltage-drop pulses whose number within a given interval of time is indicative of the digital value being counted; and I further provide a second transistor which is controlled from the first transistor and connected in series with the primary winding of a transformer whose secondary winding provides positive feed-back to the control circuit of the first transistor and is connected to the capacitor voltage in series with the resistor and in series with a Zener diode.

The breakdown voltage of the Zener diode determines the critical limit voltage of the integrating device. As soon as this limit voltage is exceeded, the capacitive discharge is released. It has been found that such a device according to the invention, despite its great simplicity, operates at extreme accuracy because a very slight increase of the capacitor charging voltage above the value determined by the breakdown voltage of the Zener diode suffices for reliably initiating the discharge. This is due to the mutual or positive feed-back control of the two transistors. The current flow through the Zener diode need not be sufficient for rendering the transistor completely conductive because immediately upon commencement of the current flow the further increase of transistor conductance up to the full value is obtained by mutual or positive feed-back control of the two transistors. Consequently, the limit voltage at which the capacitor discharge is released remains substantially the same for all discharging performances. Furthermore, the discharge proceeds and terminates very rapidly. Tests have shown that the discharge time with a trigger frequency for example of 20 c.p.s. amounts to no more than about 4% of the charging time.

An embodiment of an electronic integrating device according to the invention is illustrated on the drawing by way of example.

A capacitor 1 is charged with current $I_e$ from the negative and positive current-supply leads, this current corresponding to the time function to be integrated. Parallel connected to the capacitor 1 is a first transistor 2 in series with a resistor 3. Also parallel connected to the capacitor 1 is a second transistor 4 in series with the primary winding 5 of a transformer 6. The transistor 4 is controlled from the first transistor 2. The secondary winding 7 of the transistor 4 is connected in the control circuit of the first transistor 2 extending between the base and the emitter of the transistor. Connected between the collector and the base electrode of the first transistor 2 is a Zener diode 8 which serves for releasing the capacitor discharge. In order to prevent undesired oscillations at the transformer, an ordinary diode is connected parallel to the secondary winding 7 to serve as a damping member. The diode 9 also has the known effect of a null anode. Across the voltage-drop resistor 3 there occurs, during each capacitor discharge, a voltage pulse which is available at terminals 10, 11 and can be employed for example for controlling an electronic or other counting device.

The Zener diode 8 is connected in series with the secondary winding 7 of transformer 6 and in series with the resistor 3 to the voltage of capacitor 1. When the breakdown voltage of the Zener diode is reached by the capacitor voltage, then a control current flows in the base electrode of the first transistor 2 so that this transistor is turned on. The resulting increase in current through resistor 3 renders the voltage level more negative at the base of transistor 4. This causes the transistor 4 to be turned on so that a voltage is induced in the secondary 7 of the transformer 6. The transformer 6 is dimensioned and poled so that with increasing collector current of the transistor 4 the transistor 2 becomes turned on to a greater extent. By virtue of this mutually aiding control of the transistors 2 and 4 the discharge operation is maintained even as the capacitor voltage drops below the Zener voltage. As mentioned above, a minute control current for transistor 2 is sufficient for triggering the discharge operation.

After completed discharge, no more voltage is induced in the secondary winding 7 so that both transistors are turned off. Since the discharge lasts only a negligible fraction of the charging period, the number of the voltage pulses produced at the resistor 3 and available between the terminals 10 and 11 is an accurate measure for the integral of the current $I_e$. It has been found favorable to dimension the device for a trigger frequency in the range of about 1 to about 20 c.p.s.

To those skilled in the art it will be obvious upon a study of this disclosure that minor changes in circuitry and individual components can be made and hence that the invention can be given embodiments other than particularly illustrated and described herein, without departing from the essential features of my invention and within the scope of the claims annexed hereto.

I claim:

1. An electronic device for digital integration of a time function available in form of an electric current, comprising direct-current supply leads, a capacitor connected between said leads to be charged by continuous current therefrom, a first transistor and a resistor connected in series with each other across said capacitor to provide digital voltage pulses at said resistor, a transformer having a primary winding and a secondary winding, a second transistor series-connected with said primary winding across said capacitor, said second transistor having a control circuit connected to said first transistor to be controlled from said first transistor, said first transistor having a control circuit in which said secondary winding is connected, and a Zener diode connected in series with said resistor and said secondary winding to the voltage of said capacitor.

2. An electronic analog-to-digital conversion device, comprising direct-current supply leads, a capacitor connected between said leads to be charged by continuous current therefrom, a voltage-drop resistor for providing discrete voltage pulses derived from said current, a first transistor having an emitter-collector path series-connected with said resistor between said supply leads and having a base lead for periodic control of current flow through said resistor, a transformer having a primary winding and a secondary winding, a second transistor having an emitter-collector path poled in the same sense as said path of said first transistor relative to said supply leads and connected serially with said primary winding between said supply leads, said second transistor having a base connected to a circuit point between said first transistor and said resistor to be controlled by said first transistor, said secondary winding being connected to said base lead of said first transistor in positive feed-back relation, and a Zener diode connected in series with said resistor and said secondary winding to the voltage of said capacitor.

3. An electronic device for digital integration of a time function available in form of an electric current, comprising direct-current supply leads, a capacitor connected between said leads to be charged by continuous current therefrom, a first transistor and a resistor connected in series with each other across said capacitor to provide digital voltage pulses at said resistor, a transformer having a primary winding and a secondary winding, a second transistor series-connected with said primary winding across said capacitor, said second transistor having a control circuit connected to said first transistor to be controlled from said first transistor, said first transistor having a control circuit in which said secondary winding is connected in positive feed-back relation, and a Zener diode connected in series with said resistor and said secondary winding to the voltage of said capacitor for triggering the capacitor discharge when the capacitor voltage rises above the Zener break-through voltage, and a diode connected across said secondary winding.

References Cited in the file of this patent

UNITED STATES PATENTS 3,054,043 Werner ---------------- Sept. 11, 1962